United States Patent
Peter et al.

(10) Patent No.: US 11,741,036 B2
(45) Date of Patent: Aug. 29, 2023

(54) UNIFIED SMART CONNECTOR

(71) Applicant: Visa International Service Association, San Francisco, CA (US)

(72) Inventors: Sabu Peter, Foster City, CA (US); Karthikeyan Kandasamy, Fremont, CA (US); Hong Zhu, Foster City, CA (US); Anna Meklin, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 761 days.

(21) Appl. No.: 16/482,248

(22) PCT Filed: Feb. 17, 2017

(86) PCT No.: PCT/US2017/018464
§ 371 (c)(1),
(2) Date: Jul. 30, 2019

(87) PCT Pub. No.: WO2018/151731
PCT Pub. Date: Aug. 23, 2018

(65) Prior Publication Data
US 2020/0004710 A1    Jan. 2, 2020

(51) Int. Cl.
*G06F 13/40* (2006.01)
*G06N 20/00* (2019.01)
(Continued)

(52) U.S. Cl.
CPC .......... *G06F 13/40* (2013.01); *G06F 11/3447* (2013.01); *G06F 15/16* (2013.01);
(Continued)

(58) Field of Classification Search
CPC ........ G06F 13/40; G06F 15/16; G06F 15/163; G06F 11/34; G06F 11/3447; G06F 9/152;
(Continued)

(56) References Cited

U.S. PATENT DOCUMENTS 6,691,116 B1   2/2004  Bart
7,853,563 B2  12/2010  Alvarado et al.
(Continued)

FOREIGN PATENT DOCUMENTS

WO    2014031616    2/2014

OTHER PUBLICATIONS

PCT/US2017/018464, "International Search Report and Written Opinion", dated Nov. 16, 2017, 12 pages.
(Continued)

*Primary Examiner* — James N Fiorillo
(74) *Attorney, Agent, or Firm* — Kilpatrick Townsend & Stockton LLP

(57) ABSTRACT

Techniques are provided for centrally analyzing data in a cloud environment. Data can be received from a cloud provider and a machine learning model of a unified smart connector is applied to the data in order to create modeled data. An operation status can be determined based on the modeled data and the unified smart connector can independently determine, for example, if additional data is needed, the type of data needed, and the source of the data.

20 Claims, 7 Drawing Sheets

(51) Int. Cl.
  *G06F 16/25*  (2019.01)
  *G06F 11/34*  (2006.01)
  *G06F 15/16*  (2006.01)
  *H04L 41/50*  (2022.01)
(52) U.S. Cl.
  CPC .......... *G06F 16/252* (2019.01); *G06N 20/00* (2019.01); *H04L 41/5096* (2013.01); *G06F 2201/81* (2013.01)
(58) Field of Classification Search
  CPC .......... G06F 16/10; G06F 16/20; G06F 16/25; G06F 16/252; G06F 16/285; G06F 16/2474; G06F 2201/81; H04B 10/25; G06N 20/00; H04L 41/50; H04L 41/5096; H04L 41/5054; H04L 67/10; H04L 67/327; H04L 47/821; G06Q 30/02; G06Q 30/0201; G06Q 10/04; G06Q 10/06313
  USPC .......................................................... 709/203
  See application file for complete search history.

(56) References Cited

U.S. PATENT DOCUMENTS

| | | | |
|---|---|---|---|
| 8,407,367 B2 | 3/2013 | Chandra et al. | |
| 8,769,131 B2 | 7/2014 | Pomerantz et al. | |
| 8,769,613 B2 | 7/2014 | Latchem et al. | |
| 8,886,806 B2 | 11/2014 | Tung et al. | |
| 8,972,725 B2 | 3/2015 | Arun et al. | |
| 9,280,678 B2 | 3/2016 | Redberg | |
| 2012/0023041 A1* | 1/2012 | Kariv | H04L 41/147 703/13 |
| 2014/0047099 A1* | 2/2014 | Flores | H04L 67/75 709/224 |
| 2014/0122387 A1* | 5/2014 | Chi | G06N 5/04 706/12 |
| 2014/0173683 A1* | 6/2014 | Zhang | G06F 21/44 726/1 |
| 2014/0278623 A1* | 9/2014 | Martinez | G06Q 10/06 705/7.12 |
| 2016/0036921 A1* | 2/2016 | Sama | H04L 67/141 709/228 |
| 2018/0084081 A1* | 3/2018 | Kuchibhotla | H04L 67/51 |
| 2020/0074323 A1* | 3/2020 | Martin | G06F 17/142 |

OTHER PUBLICATIONS

Anjos et al., "SMART: An Application Framework for Real Time Big Data Analysis on Heterogeneous Cloud Environments", 2015 Ieee International Conference On Computer And Information Technology; Ubiquitous Computing And Communications; Dependable, Autonomic And Secure Computing; Pervasive Intelligence And Computing, Ieee, Oct. 26, 2015, pp. 199-206.

Casalboni, "Bigml: Machine Learning Made Easy", Retrieved from the Internet: URL:https://cloudacademy.com/blog/bigml-machine-learning/, Apr. 26, 2015, 14 pages.

EP17897114.9, "Extended European Search Report", dated Dec. 6, 2019, 9 pages.

* cited by examiner

UNIFIED SMART CONNECTOR

This application is filed under 35 U.S.C. Section 371, which claims the benefit of the filing date of PCT Patent Application No. PCT/US2017/018464 filed Feb. 17, 2017, which is herein incorporated by reference in its entirety for all purposes.

FIELD

The present disclosure generally relates to a system and method for providing a unified smart connector, such as a unified data-as-a-service (DaaS) smart connector, in a cloud environment.

BACKGROUND

Multiple cloud providers are often used by transaction processors (e.g., businesses or companies that process transactions, such as Visa™) in order to accomplish their business needs. Cloud providers can include, for example, case management and task management system providers, web analytics service providers, enterprise marketing management providers, mobile engagement platform providers, etc. Cloud providers can provide services as well as data, such as Big Data. As the number of cloud providers continues to grow, the number of cloud providers used by, for example, transaction processors, also increases. Different cloud providers may be used for different service needs. Each of these cloud providers can be managing a large quantity of data. Analyzing data from all of these different cloud providers can be burdensome and time consuming. Also, in the Internet of Things (IoT) environment, many devices are interconnected and many devices can exchange data. Therefore, the amount of data that is available for analysis is considerable.

Given the amount of data available, it may not be possible for an analyst to review all of the data available. An analyst can be an employee of the transaction processor and can be a member of an analyst team for the transaction processor. Therefore, it may not be possible for an analyst to accurately assess an operation status (e.g., lack of enrollment, website malfunction, etc.).

For example, if a website is not working, there may be a large amount of data received about the website and an analyst may not be able to trawl through or search among the large quantity of data in order identify why a website is not working correctly.

In another example, online payment systems that remove the need to share card details with retailers, such as Visa Checkout™, may have a general conversion rate of a certain percentage (e.g., X %). A conversion rate can be directed to an enrollment conversation rate. If the conversion rate drops below 10% of X %, analysts usually have to trawl through detailed data in order to determine the reason for the drop in the conversion rate. That is, analysts have to download the data and then search through this information until the desired information is located. However, even after searching through all the data, the downloaded data may not be sufficient to address the issue and the analyst will have to determine the source of needed additional information in order to identify a reason for the problem.

A data connector can be used to send data from cloud providers to a transaction processor, however, the data connector acts as a connection point from cloud providers to the transaction processor. Current data connectors are not structured to analyze data. Therefore, an analyst can obtain data from cloud providers via the data connector, however, the analyst has to analyze all of the data and the analyst has to identify what, if any, additional data is needed and the source of such data. This is difficult to perform on a regular basis given the amount of data that is available. Further, it would take a significant amount of time to analyze all the data, which can result in delays in resolving data-related issues. Sometimes the amount of data available for analysis may be so large that it is not possible for the analyst to analyze all of the data. Therefore, it may be difficult to determine the cause of an operation issue.

Example embodiments address these and other problems, individually and collectively.

SUMMARY

Systems, methods and computer-readable mediums for providing a unified smart connector in a cloud environment are described.

In accordance with an example embodiment, a method of centrally analyzing data in a cloud environment can include receiving, by a unified smart connector, data from one or more cloud data sources, sending the received data to a table for storage, applying a machine learning model to the data stored in the table to create modeled data, predicting a status of an operation based on the modeled data, determining whether the status of the operation satisfies a predetermined threshold, and in response to the status being below the predetermined threshold, automatically determining, by the unified smart connector, that additional data is needed from the one or more cloud data sources.

In accordance with an example embodiment, the method can further include automatically identifying the additional data that is needed from the one or more cloud data sources, automatically requesting the additional data from the one or more cloud data sources, and sending the requested additional data to the table for storage.

In accordance with an example embodiment, the unified smart connector connects the one or more cloud data sources to one or more cloud data targets, and wherein the table is stored in the one or more cloud data targets.

In accordance with an example embodiment, the unified smart connector is a data-as-a-service (DaaS) connector configured to provide DaaS.

In accordance with an example embodiment, the machine learning model comprises one of an autoregressive integrated moving average (ARIMA) model, a support vector machine (SVM) model, and an artificial neural network (ANN) model.

In accordance with an example embodiment, the data from the one or more cloud data sources is historical aggregated data.

In accordance with an example embodiment, the one or more cloud data sources are cloud data providers.

In accordance with an example embodiment, the unified smart connector is configured to predict the status of the operation upon receipt of the data from the one or more cloud data sources.

In accordance with an example embodiment, the method includes in response to the status of the operation being below the predetermined threshold, providing a user with an alert regarding the status of the operation.

In accordance with an example embodiment, the method includes providing a report to a user identifying areas of the operation requiring user attention.

In accordance with an example embodiment, the unified smart connector is central connector configured to perform authentication, extraction, transformation and publishing of data from the one or more cloud data sources.

In accordance with an example embodiment, the unified smart connector is a metadata driven connector configured to process data from the one or more cloud data providers in a metadata framework.

In accordance with an example embodiment, a device includes one or more processors, and a memory coupled to the one or more processors, the memory comprising code for causing the one or more processors to implement a method including receiving, by a unified smart connector, data from one or more cloud data sources, sending the received data to a table for storage, applying a machine learning model to the data stored in the table to create modeled data, predicting a status of an operation based on the modeled data, determining whether the status of the operation satisfies a predetermined threshold, and in response to the status being below the predetermined threshold, automatically determining, by the unified smart connector, that additional data is needed from the one or more cloud data sources.

In accordance with an example embodiment, the device includes code for causing the one or more processors to automatically identifying the additional data that is needed from the one or more cloud data sources, automatically requesting the additional data from the one or more cloud data sources, and sending the requested additional data to the table for storage.

In accordance with an example embodiment, a non-transitory computer-readable storage medium stores a plurality of instructions executable by one or more processors to cause the one or more processors to perform operations including receiving, by a unified smart connector, data from one or more cloud data sources, sending the received data to a table for storage, applying a machine learning model to the data stored in the table to create modeled data, predicting a status of an operation based on the modeled data, determining whether the status of the operation satisfies a predetermined threshold, and in response to the status being below the predetermined threshold, automatically determining, by the unified smart connector, that additional data is needed from the one or more cloud data sources.

In accordance with an example embodiment, the non-transitory computer-readable storage medium stores a plurality of instructions executable by one or more processors to cause the one or more processors to perform operations including automatically identifying the additional data that is needed from the one or more cloud data sources, automatically requesting the additional data from the one or more cloud data sources, and sending the requested additional data to the table for storage.

The foregoing, together with other features and exemplary embodiments, will be described in more detail below.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
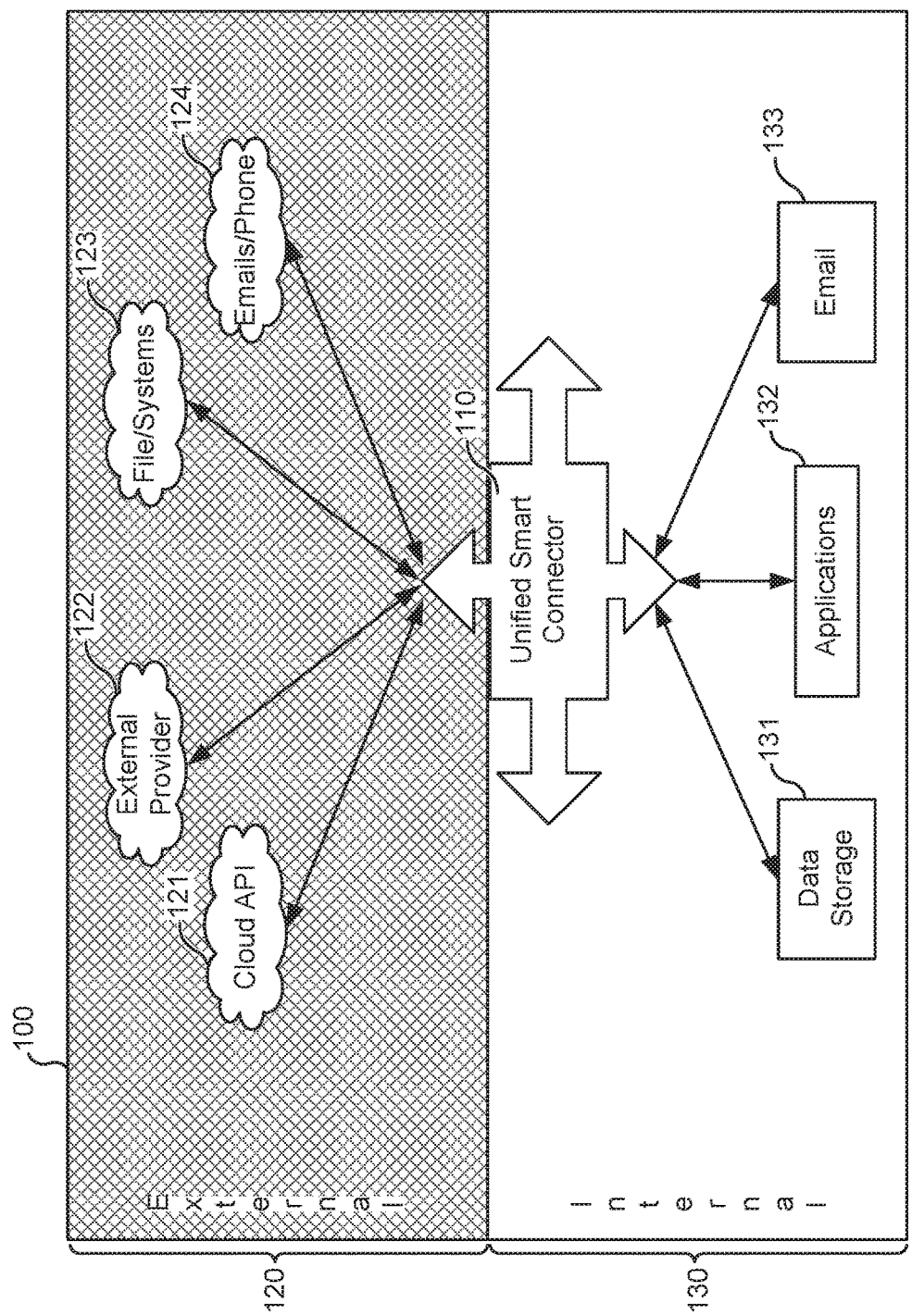
FIG. 1 illustrates a system diagram of a unified smart connector in a cloud environment, in accordance with some embodiments.

In the following description, for the purposes of explanation, specific details are set forth in order to provide a thorough understanding of the exemplary embodiments. However, it will be apparent that various embodiments may be practiced without these specific details. The figures and description are not intended to be restrictive.

Before discussing the embodiments, some descriptions of some terms may be helpful.

An "access device" may be any suitable device for providing access to an external computer system. An access device may be in any suitable form and may be a device in the Internet of Things (IoT). Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "API message" may be a formatted message that facilitates communications between system components according to an application programming interface or API. The API message may allow system components to share data and initiate actions on each other's behalf. For example, an API message may comprise identifying data that may initiate a server computer to return a value based on the identifying data.

An "application programming interface" or "API" may be a set of routines, protocols, and tools that specify how system components should interact. The API may allow various components of a system to generate, send, and receive to and from each other in a recognizable format. The API may be preconfigured, installed, or programmed onto a device, and may instruct the device to perform specified operations and networking commands. The API may allow for the request of services by initiating calls to specific instructions or code stored in an application.

An "application" may be computer code or other data stored on a computer readable medium (e.g. memory element or secure element) that may be executable by a processor to complete a task.

An "authorizing entity" may be an entity that authorizes a request. Examples of an authorizing entity may be an issuer, a governmental agency, a document repository, an access administrator, etc. An authorizing entity may operate an authorization computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "communication device" may be a device that includes one or more electronic components (e.g., an integrated chip) that can communicate with another device. For example, a communication device can be a computing device having at least one processor coupled to a memory that stores instructions or code for execution by the processor. Examples of a communication device may include a portable communication device. A "portable communication device" may be a communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, health monitoring device such as a fitness band, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle).

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer. In some embodiments, an issuer may refer to a provider of a software application.

A "memory" may be any suitable device or devices that can store electronic data, A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "resource provider" may be an entity that can provide a resource such as goods, services, information, and/or access. Examples of a resource provider includes merchants, data providers such as government agencies, transit agencies, etc. A "merchant" may typically be an entity that engages in transactions and can sell goods or services, or provide access to goods or services.

A "resource provider computer" may be a computer operated by a resource provider. Suitable computers may include access devices, back end server computers, as well as combinations of the above.

A "service provider" may be an application provider, which may be an entity that provides an application to a mobile device for use by a user. In some embodiments, the service provider may be a wallet provider computer and can provide a mobile wallet or payment application (e.g., wallet application) to a user device. A service provider computer may operate a server computer that may send and receive messages to and from service provider application. The service provider account issued by service provider computer may also be accessed by a website. In some embodiments, the service provider computer may maintain one or more digital wallets for users of services provided by the service provider. Each digital wallet may be associated with payment data for one or more payment accounts. An example of a digital wallet may be Visa Checkout™. A service provider can correspond to a cloud provider.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "transaction processing computer" may include a network of one or more devices that can process and route transaction request messages. The network of one or more devices can be referred to as a transaction processing system. A transaction processor may be a business or company (e.g., Visa™) that processes transactions via the transaction processing computer. An exemplary transaction processing computer may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™ in particular, may include a VIP system (Visa Integrated Payments system) which processes authorization requests and a Base II system which performs clearing and settlement services.

Techniques are provided for efficiently processing data through a unified smart connector. The unified smart connector centrally manages data to and from a plurality of cloud providers and a transaction processor. The unified smart connector is configured to maintain consistency in an operation status, such as web-site functionality.

A. System

FIG. 1 illustrates a system diagram of a unified smart connector 110 in a cloud environment 100, in accordance with some embodiments. As shown in FIG. 1, the unified smart connector 110 connects elements in a multi-layer environment.

The cloud environment 100 is a multi-channel environment because the environment provides the ability to interact with sources and/or targets on various platforms. The environment is a multi-layer environment since it can include, for example, an internal-internal environment, an internal-external environment, and an external-external environment. The multi-layer environment can include layers which are external and internal to the transaction processor.

The external environment 120 can include a cloud API 121, an external provider 122, a file and system provider 123, and an email and phone provider 124. The cloud API 121 can include an API for enrollment conversion. Communication with the API can be performed via an API message. Further, communication with the external environment can be performed via an access device or communication device. The access device and/or the communication device can be a device in the IoT. An external provider 122 can include, for example, issuers and acquirers.

The elements in the external environment and the elements in the internal environment can act as a source, as a target, or as both a source and a target of data. The unified smart connector enables two-way communication. A user can upload data to cloud providers on demand as well as extract information from cloud providers.

The internal environment 130 can include data storage 131, applications 132 and e-mail 133. Data storage 131 can include, for example, a software framework for distributed storage that can include tables. Applications 132 can corresponds to various types of applications that store data in the internal environment. E-mail 133 can correspond to, for example, e-mails containing data information from the cloud providers.

These are merely examples and the external environment 120 and the internal environment 130 can include different elements. The elements in the external environment 120 and the internal environment 130 may act as a source location of information, a target location for storing information or both a source location and a target location. Further, although the example in FIG. 1 is in a cloud environment, the environment may not be in a cloud. For example, the external and internal components may be databases and file systems that may not be stored on a cloud and may be at a physical location.

The unified smart connector 110 enables data-as-a-service (DaaS) in this multi-channel and multi-layer environment. DaaS is a service for managing data. DaaS can be offered by cloud-based providers in order to manage data. A DaaS environment can provide information to a user and provide the benefits of a cloud computing platform. The unified smart connector can also be called, for example, a unified connector, a smart connector, a unified DaaS smart connector.

The unified smart connector can be on a computer server, such as a transaction processing computer, that is stored at a facility of the transaction processor. However, this is merely an example, and the server can be stored at a location other than a location of the transaction processor. Further, the server can also be stored in a cloud. Although the examples described are in relation to a transaction processor analyzing the data, a unified smart connector as disclosed in the example embodiments can be used by others needing to analyze data. For example, cloud providers may also implement a unified smart connector in accordance with the example embodiments.

The unified smart connector 110 can be used to analyze a plurality of different operation scenarios. The unified smart connector 110 is capable of performing, for example, dynamic data configuration, source and target configuration, data governance and dynamic data security, dynamic data streaming and transformation, and dynamic data mining and data aggregation.

In accordance with another embodiment, the unified smart connector can be a metadata driven connector.

Therefore, the unified smart connector provides a single central connection between sources and targets for a transaction processing system. A single central unified smart connector simplifies the authentication, extraction, transformation and publishing of data. Thus, data driven decisions can be performed quickly and efficiently.

B. Connector

Figure 2:
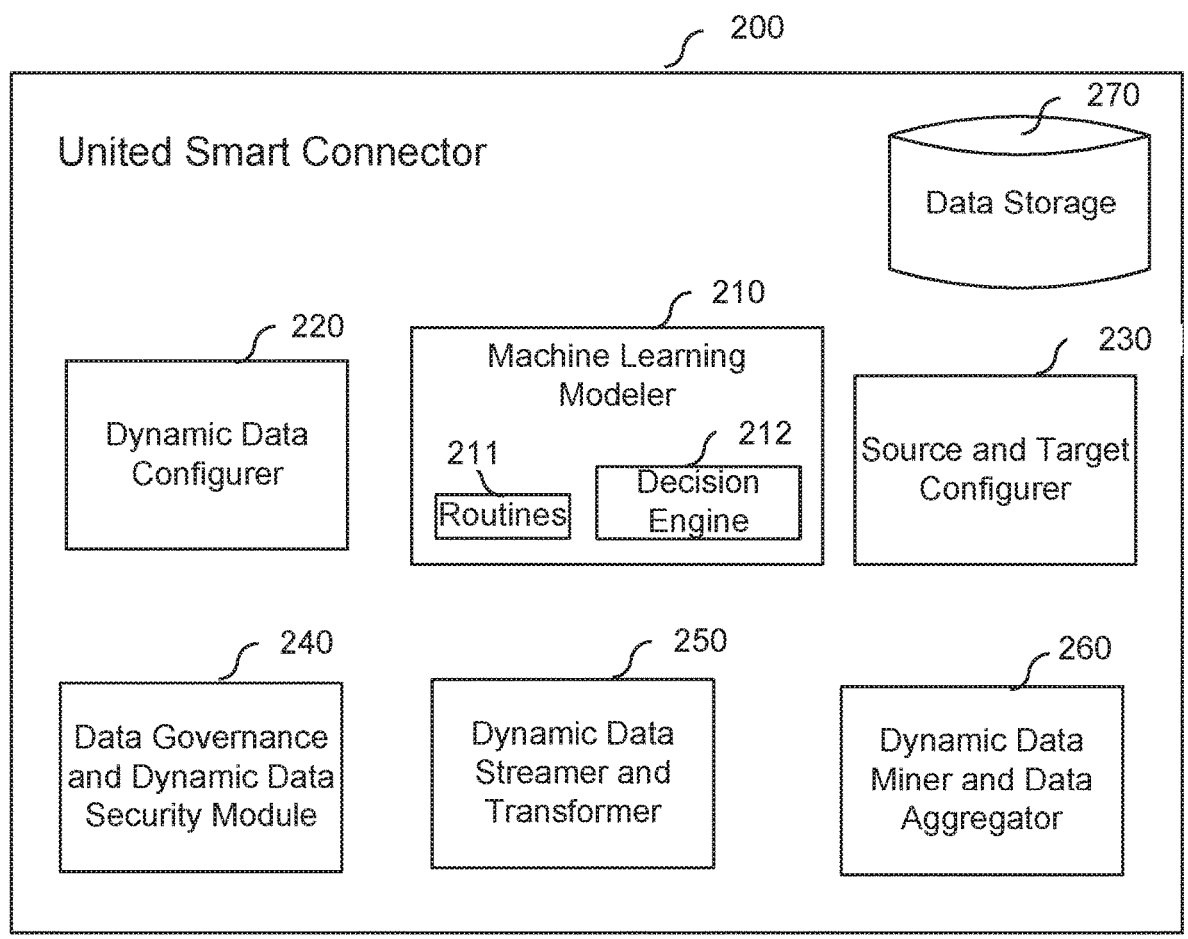
FIG. 2 illustrates a block diagram of a unified smart connector, in accordance with some embodiments.

FIG. 2 illustrates a block diagram of a unified smart connector 200, in accordance with some embodiments. The unified smart connector 200 shown in FIG. 2 can correspond to, for example, the unified smart connector 110 shown in FIG. 1. The unified smart connect 200 can be a unified data-as-a-service (DaaS) smart connector.

The unified smart connector 200 can be stored in a server computer or a transaction processing computer of a transaction processing system. The server computer can include a processor and a memory. The server computer can be stored at a physical location of the transaction processor or the server computer can be stored in a cloud environment.

As shown in FIG. 2, the unified smart connector 200 includes a machine learning modeler 210 including routines 211 and a decision engine 212, a dynamic data configurer 220, a source and target configurer 230, a data governance and dynamic data security module 240, a dynamic data streamer and transformer 250, a dynamic data miner and data aggregator 260, and a data storage 270. Although these elements are shown as separate elements in the unified smart connector 200, one or more of the elements may be combined as a single element. Further, although particular functions of the machine learning modeler 210, dynamic data configurer 220, source and target configurer 230, data governance and dynamic data security module 240, dynamic data streamer and transformer 250, dynamic data miner and data aggregator 260, and a data storage 270, are described, the functions of these elements may overlap and the described functions are not limited to a particular element of the unified smart connector.

The machine learning modeler 210 can include an embedded decision engine 212 and embedded machine learning routines 221, such as decision trees or machine learning algorithm models, that make the decision of bringing in aggregated, analytical, or detailed information. The decision engine 212 profiles the data in-flight and makes the decision of bringing in additional information or additional analytics if needed. The machine learning routines 221 can vary according to the operation status that is being determined. The analysts can modify the machine learning capabilities of the machine learning modeler 210.

The machine learning modeler can apply routines to data in order to determine an operation status. For example, online payment systems, such as Visa Checkout™, that remove the need to share card details with retailers, may have a general conversion rate of a certain percentage (e.g., X %). A conversion rate is the percentage of visitors who complete a goal, as set by for example, a website owner. A conversion rate is a number of impressions that have been displayed to a user in relation to the number of user's enrolling in the program (e.g., online payment system). The number of times that the online payment system checking button is displayed is compared with the number of times it is actually selected to use for payment.

The goal can correspond to, for example, a number of users that select the online payment system as their method of payment for a transaction. Selection of the online payment system can be determined by, for example, a user selecting the logo for the online payment system when paying for a transaction. If the conversion rate drops below 10% of X %), analysts usually have to trawl through detailed data (download the data and then trawl through this information).

In accordance with an embodiment, the decision engine 220 calculates the differential in-flight and brings down the detailed data (e.g., data from the cloud providers) for further analysis. The decision engine 210 can be trained so that it can quickly and efficiently perform analysis. The transaction processor can then be alerted of any potential issues. For example, analysts, an analytic team, or a technology team of the transaction processor can be alerted to any issues or on a general operating status. The issues and the operation status may be sub-optimal, optimal or above optimal, based on the information desired by the user. The alert can be provided via phone, email, text, or any kind of notification as requested by the user. The method of notification can be programmed in the data (e.g., metadata) stored in data storage 270 of the unified smart connector.

Dynamic data configurer 220 enables applications to decide how, when and where the data needs to flow. For example, the dynamic data configurer 220 can identify the sources of multiple pieces of data and the particular data to receive from the sources. The sources of data can be from cloud providers, issuers, internal research systems, enterprise warehouse data (e.g., big data). The dynamic data configurer 220 identifies the one or more sources needed to resolve or address an issue. The dynamic data configurer 220 can determine how much data is needed and from which sources. The data that is determined can be based on metadata that is stored in the unified smart connector.

In addition, the dynamic data configurer 220 can be programmed to determine the frequency of obtaining data. The dynamic data configurer 220 can be configured to retrieved data from one or more cloud providers at the end of every business day.

The source and target configurer 230 can be directed to source and target authentication and source and target connectivity. Data can be sent to and received from cloud providers, such as cloud data providers. Further, data can be sent to or received from external partners, such as issuers and acquirers. Although particular elements are identified as a source or a target, an element can act as both a source and a target. For each of the sources and targets, connectivity and authentication can be established. Configuration data and user authentication for each source and target can be determined. Configuration data can include a platform of the source and target. Further, configuration data can include the path from a source to a target or from a target to a source.

The data governance and dynamic data security module 240 enables data and rule level access among different applications and systems. The data governance and dynamic data security module 240 also enables data encryption and decryption depending upon the sensitivity of the data. For example, particular data may only be accessible to particular users or analysts of the transaction processor. Therefore, each of the pieces of data may have corresponding rules regarding accessibility and storage, such as how the data should be stored and controls that are placed on the data.

The dynamic data streamer and transformer 250 enables both batch process and real-time (online) data process and enables data transformation in-flight. In some cases, data can be streamed directly or data can be received in batches. The detailed data can be sent directly or it can analyze the data and determine whether data should be sent. Enables data transformation in-flight since transformation can be performed while data is being received. Data transformation can include converting data from one format to another according to the source system and the target system.

The dynamic data miner and data aggregator 260 can mine or aggregate data either at the source or the target. The dynamic data miner and data aggregator 260 can determine based on the configuration of the data as to how the data should be sent. Depending upon the configuration rules, data can be mined or aggregated either at the source or the target.

The data storage 270 can store data that the unified smart connector 200 needs in order to analyze data. The data stored in data storage 270 can include metadata, as described in FIG. 3.

Figure 3:
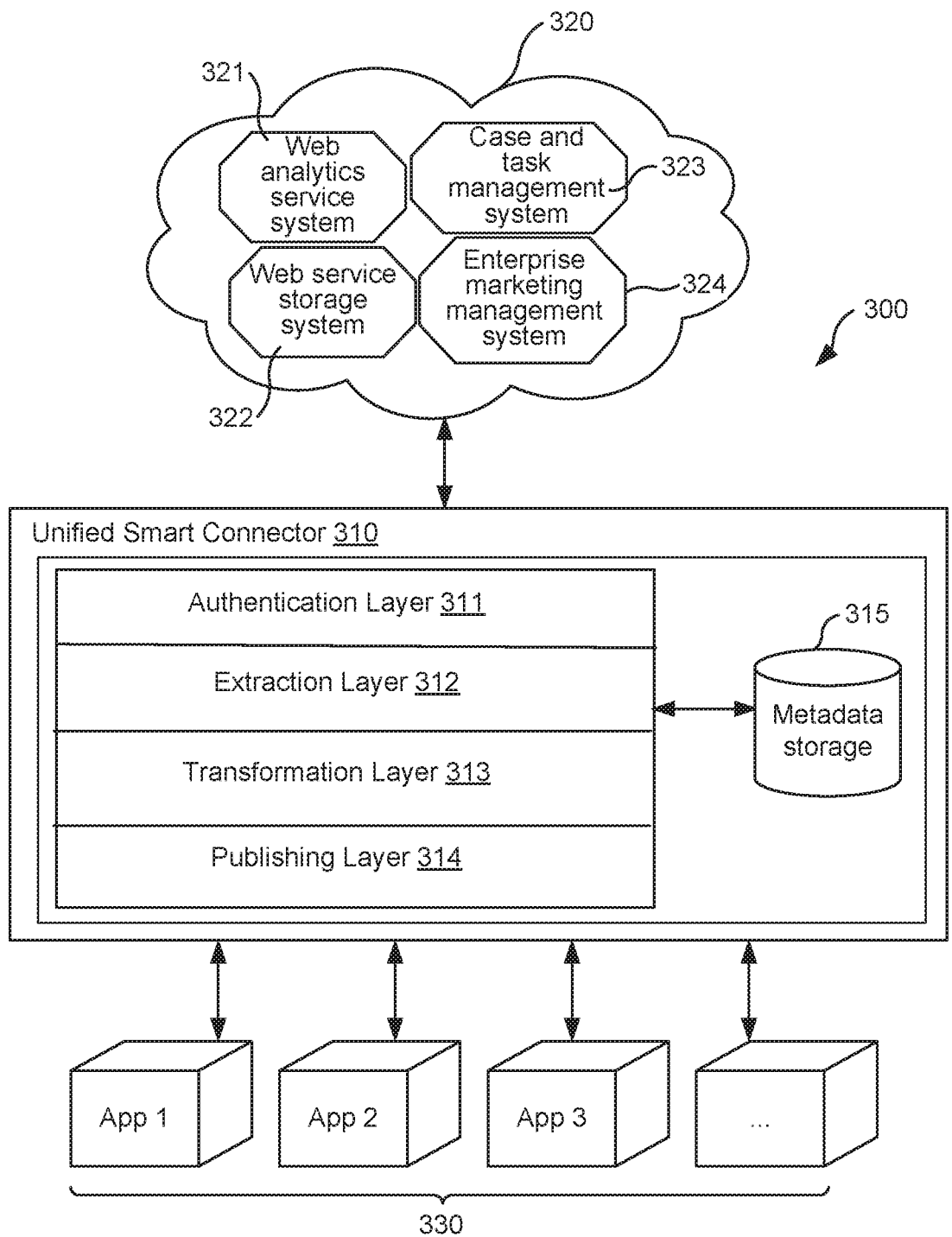
FIG. 3 illustrates a block diagram of a metadata driven unified smart connector environment, in accordance with some embodiments.

FIG. 3 illustrates a block diagram of a metadata driven unified smart connector environment 300, in accordance with some embodiments. The unified smart connector 310 can correspond to unified smart connector 110 in FIG. 1 and unified smart connector 200 in FIG. 2.

Cloud providers 320 can include cloud data providers such as, a web analytics service system 321, a case and task management system 323, a web service storage system 322, and an enterprise marketing management system 324. Communication with the cloud providers 320 can be performed via API's for each of the respective cloud providers. The data that is maintained by the cloud providers can include web and mobile application related data.

The unified smart connector 310 communicates with applications and/or systems 330. Applications and/or systems 330 are internal or external facing applications and/or systems. Applications and/or systems 330 can correspond to, for example, applications and systems for a digital wallet, for business-to-business extranet channels that provide access to information and resources, and for developer platforms.

In the example embodiment shown in FIG. 3, the data from cloud providers can be brought in or extracted by the unified smart connector of the transaction processor computer instead of requiring a separate connection to each of the cloud providers 320. Therefore, the unified smart connector acts as a centralized connector between the cloud providers and the transaction processor.

As shown in FIG. 3, the unified smart connector 310 can include a metadata storage 315 that stores authentication information, extraction information, transformation information and publishing information. As shown in FIG. 3, the metadata storage 315 has a framework or environment which includes an authentication layer 311, an extraction layer 312, a transformation layer 313 and a publishing layer 314. The framework provides a metadata-driven functionality.

The metadata storage 315 can be in addition to the data storage 230, as shown in FIG. 2 or the metadata storage 315 may replace the data storage 230 of FIG. 2. The cloud providers 320 can be identified as source locations and the applications 330 can be identified as target locations. However, this is merely an example, and the cloud providers 320 may be target locations and the applications 330 may be source locations.

The authentication layer 311 is directed to authentication data that is needed for each cloud provider. Each cloud provider can have different authentication requirements.

The extraction layer 312 is directed to how data is captured. Data capture can include methods for retrieving data from the cloud providers. That is, methods for loading and collecting data, methods for identifying the appropriate source of the data. The extraction layer 312 can identify that data will be stored in a database or a detailed data source (e.g., software framework used for distributed storage, Enterprise Data Warehouse (EDW), etc.).

The transformation layer 313 is directed to how data should be transformed or modified between the source location and the target location. Transformation can include, for example, switching from JavaScript Object Notation (JSON) to tab formatted data for loading into target systems. Transformation can also include converting a data into a corresponding local date and time for a particular application.

The publishing layer 314 is directed to the data that is to be published. The information to be published can be extracted from a source location. The publishing layer 314 can publish data using data access services. Based on the embedded routines, the unified smart connector 310 can enable the smartness of a publisher to enhance data content.

In the example embodiment shown in FIG. 3, a metadata driven framework approach is used in the unified smart connector. The framework is driven by the metadata stored in the metadata storage 315. However, FIG. 3 is merely an example, and a metadata driven approach may not be used by the unified smart connector.

C. Methods

Figure 4:
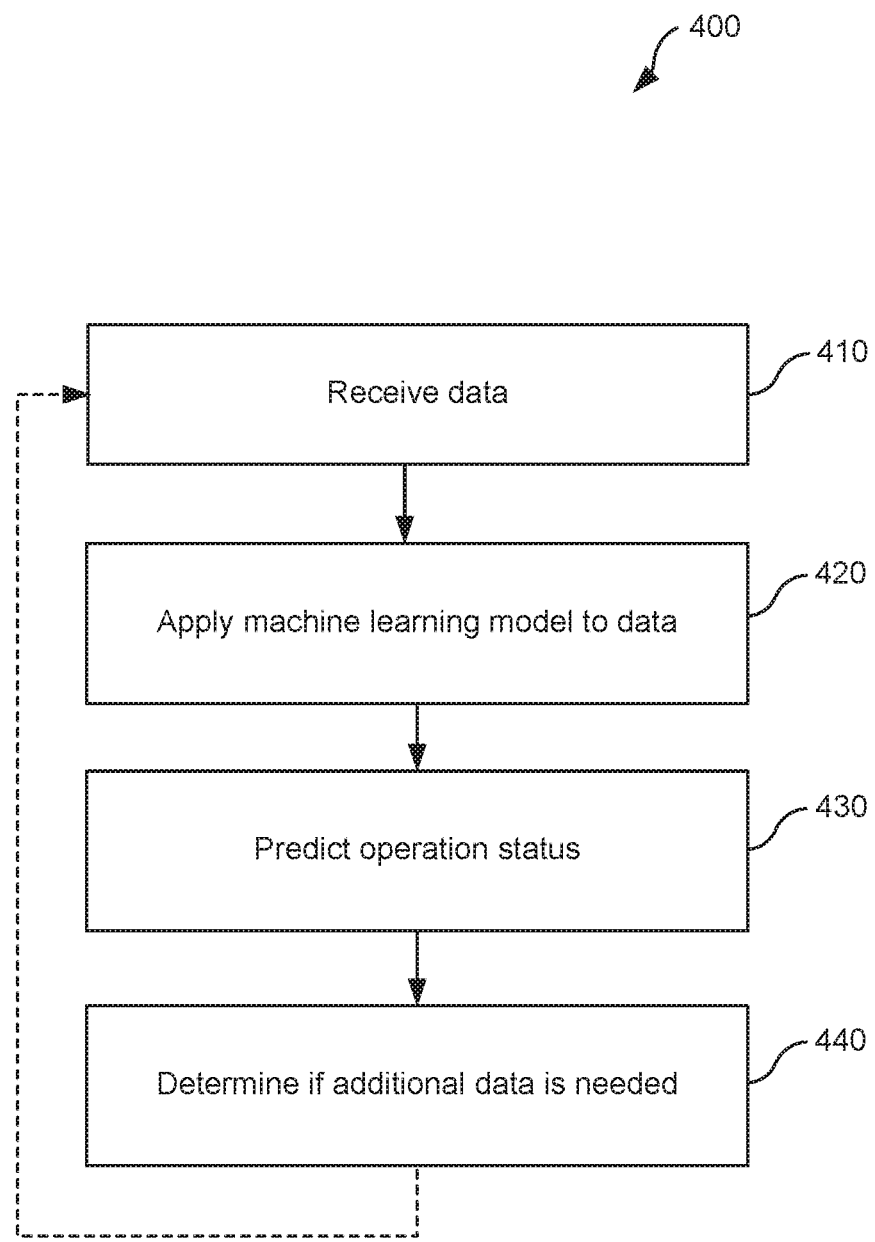
FIG. 4 illustrates a flowchart of a method for centrally analyzing data in a cloud environment, in accordance with some embodiments.

FIG. 4 illustrates a flowchart of a method 400 for centrally analyzing data in a cloud environment, in accordance with some embodiments. The method described in FIG. 4 is a general overview and more detailed examples are described in FIGS. 5, 6, and 7. The unified smart connector can be applied to analyze various different operations other than those described in FIGS. 5, 6, and 7. The method can be used to analyze the status of any operations performed by the transaction processor computer.

At step 410, the unified smart connector receives data from one or more cloud providers. The data that is received by the unified smart connector can also be referred to as historical aggregated data since it includes data that has been gathered from past data. The unified smart connector can be configured to routinely receive information for analysis. Alternatively, the unified smart connector can determine when data should be analyzed and request data from cloud providers.

The data that is received can be sent to a table for storage. The storage that is used to store the data can vary according to the type of data that is obtained. For example, web analytics data can be stored in a software framework used for distributed storage. Case management and task management system data can be stored in a an Enterprise Data Warehouse (EDW).

The software framework used for distributed storage and the EDW can be called a detailed data source. The storage can be located external to the unified smart connector or can be stored in an internal environment of the unified smart connector. However, this is merely an example, and the received data can be stored in a location as desired by, for example, a user (e.g., analyst) of the transaction processor.

After receiving the data and sending the received data to a table for storage, at step 420, a machine learning model can be applied to the data stored in the table to create modeled data. The machine learning model can be applied via, for example, the machine learning modeler 210 of FIG. 2. One or more machine learning models or routines can be applied to the data.

For example, if a specific operation outcome is desired, then a specific machine learning model may be applied to the data in order to obtain the desired result. However, if a specific outcome is not desired, the machine learning model can be a generic model that generally analyzes the data to ensure that the data is operating within a desired threshold.

At step 430, the unified smart connector predicts a status of an operation based on the modeled data that was modeled in step 420. If the status of the operation satisfies a predetermined threshold or boundary, then it can be determined that an operation status is operating as desired. For example, the smart detector can determine that additional information from a data storage framework table does not need to be obtained.

However, if the status of the operation is below the predetermined threshold, at step 440, the unified smart connector can automatically determine that additional data is required. Therefore, the unified smart connector can identify the additional data that is required, the source of such data, and the target location for storing the data. The unified smart connector can also determine the frequency on which the data should be received. If additional data is stored in the table, the method can return to step 410.

If the unified smart connector initially requests data from a first cloud provider and determines that the operation issue is not identifiable in data received from the first cloud provider, the unified smart connector can request data from a second cloud provider and determine if the problem can be identified in data managed by the second cloud provider.

If the difference is greater than or less than a predetermined rate, an alert can be sent to a user of the unified smart connector. An alert can be sent to users, such as analysts. Users can be alerted that, for example, a contract has expired, more usage than historically used is occurring, or error conditions are occurring during use.

In addition, the category of data (e.g., promotional error, code error, environment error) that is causing the drop can also be determined. Various data attributes can be collected whenever there is a drop in the conversion rate. Users can then determine what aspect of their operations requires correction, such as which aspect of their website requires correction.

Therefore, the unified smart connector can independently and automatically determine the process of analyzing data in order to obtain a desired operation status. The unified smart connector can identify anomalies and determine the cause of the anomalies. The unified smart connector can also propose solutions to the anomalies based on the history of learned data.

The method of FIG. 4 can be used to analyze sub-optimal operation statuses as well as optimal or above optimal operation statuses. For example, if there is a large increase in a conversion rate, then the unified smart connector can identify the source of the increase and can suggest options to continue such an increase based on the gathered data.

Instead of requesting all of the data from one or more service providers, the unified smart connector can identify the provider that has the desired data and the unified smart connector can identify the particular data, from among the millions of terabytes of data stored by the cloud providers, that is needed in order to obtain the desired threshold, thereby increasing the speed and efficiency in which data is analyzed.

The unified smart connector can be configured to automatically request the additional data from the cloud data source. Based on the data that is obtained, the unified smart connector can determine, for example, that the decrease in the conversion rate is due to a merchant discontinuing use of the online payment system. Alternatively, the unified smart connector can determine that the decrease in conversion rate is due to website malfunctions.

Over time, the unified smart connector can learn the preferences of the transaction processor and the information desired by the transaction processor. That is the unified smart connector can determine when data should be analyzed and when the data should be requested from cloud providers. The unified smart connector can receive the data from a web analytics service system in response to a request sent by the unified smart connector to the web analytics service system.

At step 520, the clickstream data that is received from the web analytics service system is sent to a storage. The clickstream data can be sent to a table of a framework (e.g., software framework) used for distributed storage. Table 1 below illustrates a table of a software framework used for distributed storage that stores the clickstream data.

As shown in Table 1, aggregated data of checkout clickstream data are extracted by the unified smart connector and are available in a table, such as a software framework used for distributed storage table, as shown below.

TABLE 1

| Target Column | Source Column & Transformation |
| --- | --- |
| TMAGF_MRCH_DLY_CONVRSN.CPD_DT | Date |
| MRCH_API_KEY | Merchant API Key |
| ENRL_FINISH_CNT | Enroll Finish |
| ENRL_STRT_CNT | Enroll Start |
| CHKOUT_BUTTON_IMPRSN_CNT | Checkout Button Impressions |
| CHKOUT_BUTTON_CLCK_CNT | Checkout Button Clicks |
| WIDGET_BX_NVCTN_CNT | Widget Box Invocation |
| SGNIN_SGNUP_CNT | Signed In/Signed Up |
| RVW_CNFRM_CLCK_CNT | Review & Confirm Clicked |
| RVW_CNFRM_FROM_SGNIN_CNT | Review & Confirm Signed In |
| RWV_CNFRM_FROM_SGNUP_CNT | Review & Confirm Sign Up |
| CRT_TS | TimeStamp | smart connector applies machine learning in order to provide the most accurate analysis results.

With more and more data available to perform the modeling, the accuracy of models increases. Therefore, the unified smart connector of an example embodiment enables a more efficient and less laborious way of determining a conversion rate. Further, the unified smart connector can suggest appropriate action users should take.

Since the unified smart connector is a general unified smart connector, it can be extended to support multiple operations or scenarios. Some of these scenarios are described below with respect to FIGS. 5, 6, and 7.

Figure 5:
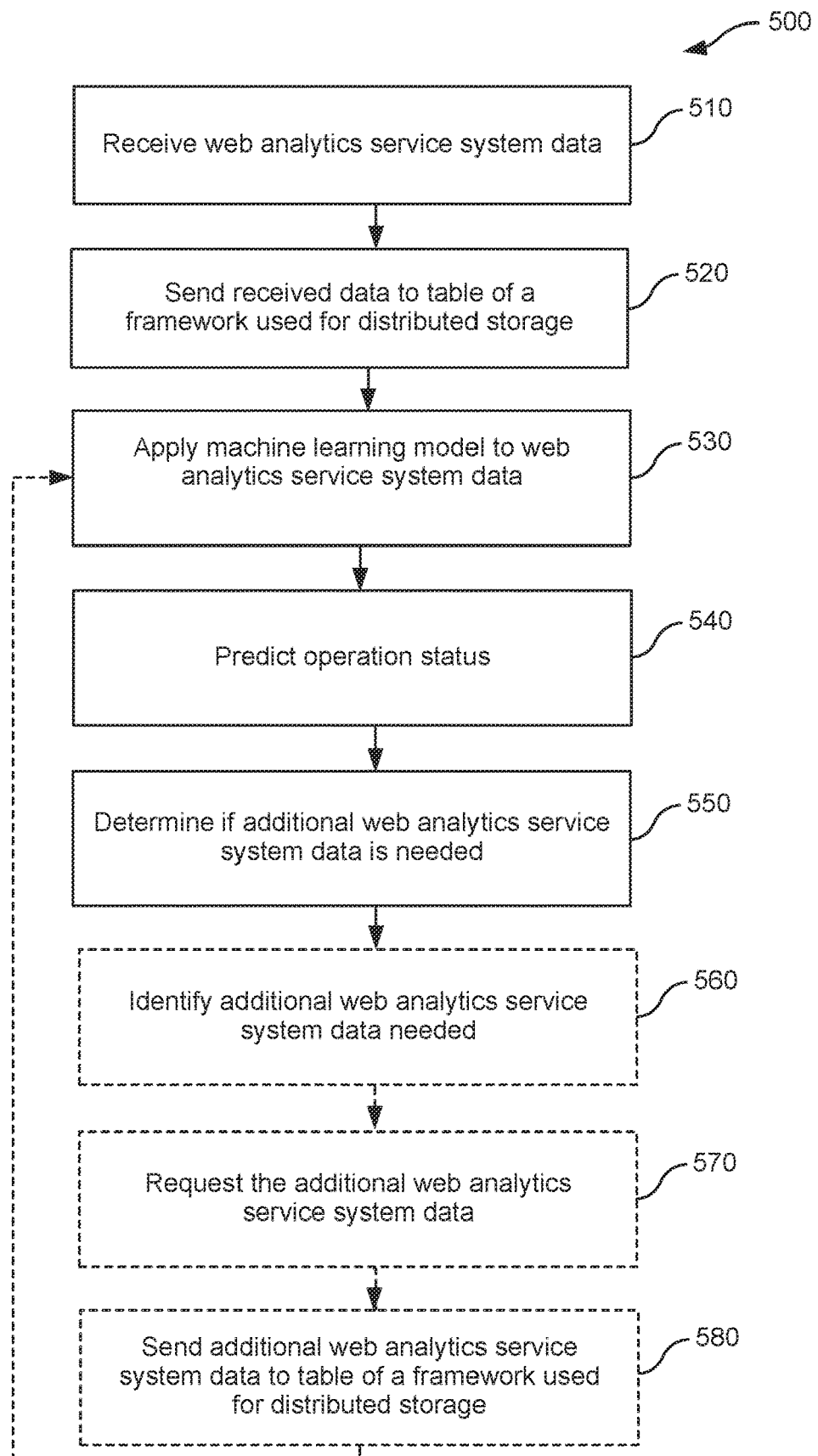
FIG. 5 illustrates a flowchart of a method for analyzing web analytics data, in accordance with some embodiments.

FIG. 5 illustrates a flowchart of a method 500 for analyzing web analytics data, in accordance with some embodiments. In the example shown in FIG. 5, the unified smart connector receives and analyzes clickstream data for an online payment system.

Clickstream data is information that a user leaves behind when visiting a website. For example, the parts of the screen a computer a user clicks on while browsing the web or other application can be recorded. As the user clicks anywhere in the webpage or application, the action is logged. The clickstream data can include information such as dates, time information, IP address, etc. Checkout clickstream data includes information that a user leaves behind during checkout.

At step 510, the unified smart connector can receive data from one or more cloud providers. The unified smart connector can receive the data by extracting the data from the cloud provider. In the example shown in FIG. 5, the data is checkout clickstream data received from a web analytics service system.

The unified smart connector can be configured to routinely receive information for analysis. Alternatively, the At step 530, a machine learning model can be applied to the data that is stored in the table (e.g., Table 1) of the framework used for distributed storage. A forecasting model or time series model can be applied to aggregated clickstream data and can be used to predict the conversion rate for a future date. For example, the forecasting model can be used at the end of each business day. Examples of forecasting models or time series models include autoregressive integrated moving average (ARIMA), Support Vector Machine (SVM), and Artificial Neural Networks (ANN). Alternatively, a decision tree can be used. A decision tree can include a structure that includes a root node, branches, and leaf nodes regarding the data analysis. However, these are merely examples, and different forecasting models can be used to obtain the conversion rate. Based on key attributes, a model can be created and trained in order to test data sets. In the example shown in FIG. 5, key attributes can include "Case No.", "Create Date," "OwnerId," "AccountId; "CloseDate," and "Product LaunchDate." However, these are merely examples and other attributes can be used.

At step 540, the operation status of the online payment application system is predicted based on the data that is modeled in step 530. The unified smart connector predicts a status of an operation based on the modeled data that was modeled in step 520. The unified smart connector can predict a status of an operation (e.g., enrollment conversion rate) for a future date. The conversion rate for the next day or next week can be predicted using the modeled data.

At step 550, the unified smart connector will automatically determine whether the status of the operation (e.g., enrollment conversion) satisfies the predetermined threshold or boundary. If the operation status threshold is satisfied; then no further action is required.

The predetermined threshold can be identified by an analyst of the transaction processor. The predetermined boundary or threshold can be based on a normal operating threshold for that particular operation. Alternatively, the unified smart connector can determine the predetermined criteria based on operation outcomes that are desired by the analyst. With respect to the conversion rate example, it can be determined that the online payment system operation should have a conversion rate of 5%-10%, and based on the modeled data, it is determined that the online payment system is operating at a conversation rate of 5-10%. Therefore, the operation is performing at the desired threshold.

If the status of the operation does not satisfy a predetermined threshold, at step 560, the unified smart connector can automatically determine additional web analytics service system data (e.g., clickstream data) that is needed from the web analytics service. The unified smart connector can be trained to make decisions via the embedded routines. Therefore, the unified smart connector can automatically decide if additional data is required. For example, if the conversion rate is identified to be at 1%, this is below the normal boundary of 5-10%. Therefore, the online payment system is operating below the desired threshold. The first data provider can correspond with the web service analytics service provider to obtain the needed additional data. Based on the additional data, decisions can be made regarding, for example, taking corrective action. The unified smart connector can automatically be corrected after receiving the additional data. Over time, the decisions can be added to embedded routines so that the system can independently make decisions.

After predicting the conversion rate for the future data, the unified smart connector determines a difference between the predicted conversion rate and a previous conversion rate. The unified smart connector applies logic in order to compare the predicted conversion rate with a previous conversion rate (e.g., yesterday or last week) to find out the difference during data processing.

At step 570, the unified smart connector will automatically request the additional needed clickstream data from the web analytics service system. The request can be configured according to, for example, the source system. A data extraction path can also be part of the embedded routine so that the routine will select the best available path.

At step 580, the additional data is sent to the table (e.g., Table 1) of the framework used for distributed storage. If additional data is stored in the table, the method can return to step 530.

The example described in FIG. 5 is with respect to a single cloud provider. However, data can be obtained from multiple cloud providers at given time. Alternatively, after receiving data from a first cloud provider, the unified smart connector can determine that the additional data that is required is from a cloud provider that is different from the initial cloud provider.

Figure 6:
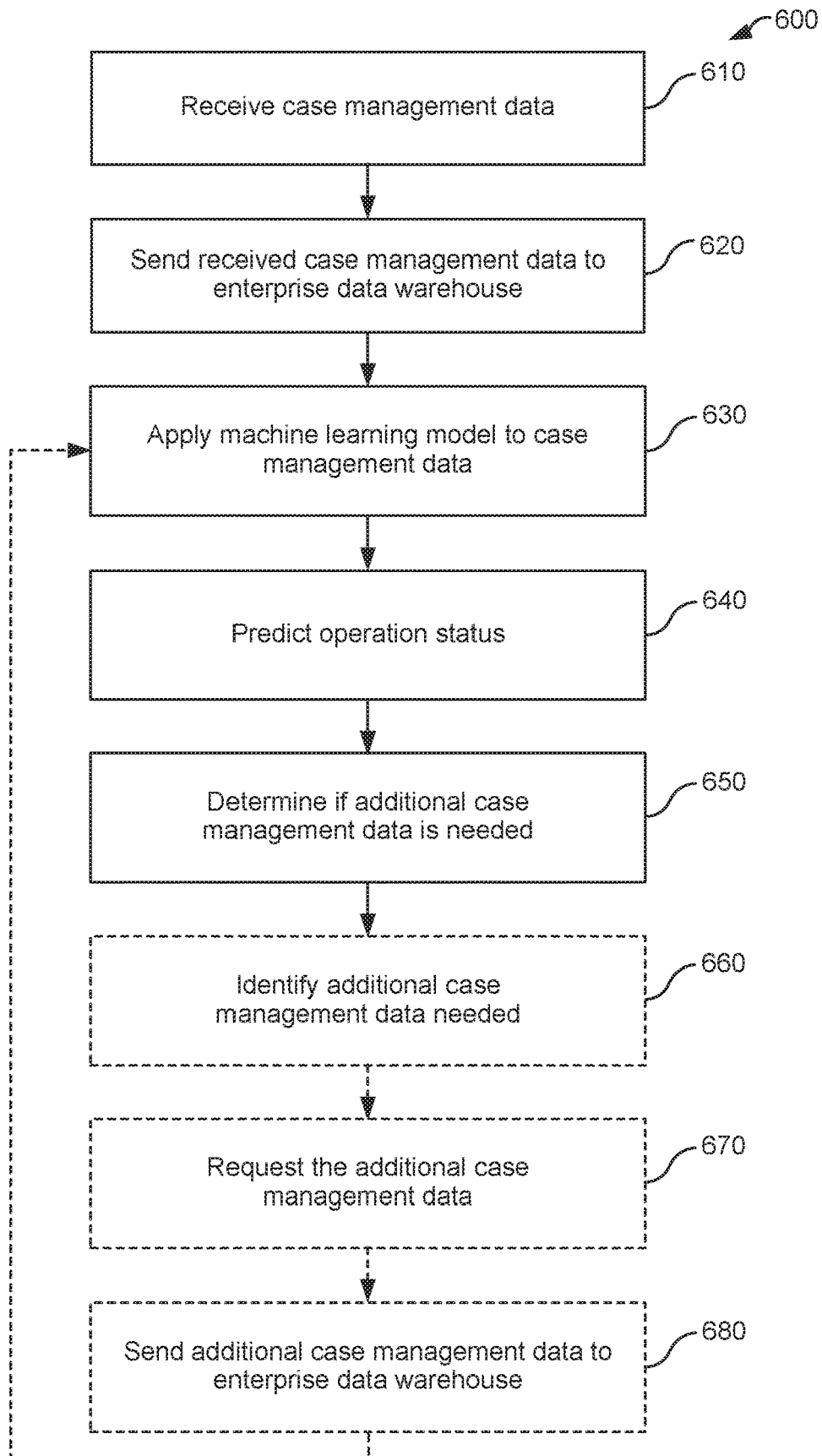
FIG. 6 illustrates a flowchart of a method for analyzing case management data, in accordance with some embodiments.

FIG. 6 illustrates a flowchart of a method 600 for analyzing case management data, in accordance with some embodiments. In the example shown in FIG. 6, the unified smart connector receives and analyzes case management data from a case management and task management system for an online payment system.

At step 610, the unified smart connector receives data from one or more cloud providers. In the example shown in FIG. 6, the data is case management data that is received from a case management data and task management system.

The unified smart connector can be configured to routinely receive information for analysis. Alternatively, the unified smart connector can determine when data should be analyzed and request data from cloud providers. The unified smart connector can receive the data from a case management data and task management system in response to a request sent by the unified smart connector to the case management data and task management system.

At step 620, the case management data that is received from the case management data and task management system is sent to a storage. The case management data can be sent to a table in an Enterprise Data Warehouse (EDW) for storage. Although an EDW is used an example, this is merely an example and different types of tables for storage can be used.

Table 2 below illustrates a table of an EDW storing the case management data. Table 2 includes data after the unified smart connector extracts customer relationship data, such as case management and task management system data, for online payment systems, such as Visa Checkout™. Case management data can include name information, product launch date, a confidence level, etc. The customer relationship data can include case management and task management data, such as a status of a contracts with the transaction processor. An Enterprise Data Warehouse (EDW) is system that can be used for reporting and data analysis. This data can be used to identify market opportunities for online payment systems, such as Visa Checkout™.

TABLE 2

| Target Column | Source & Transformation |
| --- | --- |
| OPRTUNTY_ID | Id |
| OPRTUNTY_NM | Name |
| OPRTUNTY_OWNR_USR_ID | OwnerID |
| ACCT_ID | AccountId |
| CLOS_DT | CLOSEDATE |
| OPRTUNTY_TYP_NM | Type |
| PRODCT_LNCH_DT | Product_Launch_Date_c |
| STG_NM | StageName |
| CLOSD_LOST_RSN_NM | Reason_For_Closed_Lost_c |
| OPRTUNTY_DESC | DESCRIPTION |
| CNFDNC_LVL_PCT | Confidence_Level_c |
| REC_TYP_ID | RecordTypeId |
| PROBABILITY_PCT | Null |
| SRCE_CRT_TS | CREATEDDATE |
| SRCE_CRT_USR_ID | CREATEDBYID |
| SRCE_LAST_CHG_TS | LASTMODIFIEDDATE |
| SRCE_LAST_CHG_USR_ID | LASTMODIFIEDBYID |
| SRCE_LAST_CHG_SYS_TS | SYSTEMMODSTAMP |

TABLE 2-continued

| Target Column | Source & Transformation |
| --- | --- |
| OPRTUNTY_HST_SID | AutoNumber |
| REC_ACTV_IND | Set to 'Y' for initial insert; deactivate previously active record (as identified by OPRTUNTY_ID and REC_ACTV_IND = 'Y') by updating the value to 'N' |
| REC_ACTV_END_TS | Set to '9999-12-31' for initial insert; for update set to Current Timestamp |
| CHG_TS | CurrentDateTime |
| CHG_DT | DATE(Current DateTime) |

At step 630, a machine learning model can be applied to the data that is stored in the table (e.g., Table 2) of the EDW.

Based on key attributes, a model can be created and trained in order to test data sets. Data can also be received from the case management and task management system based on an opportunity closing date. An opportunity closing date can be a date before a potential sales decision has to be made. The case to management and task management system data key attribute may be "create date." The web analytics service system key attributes may be "review and confirm signed-in" and "review and confirm sign-up." Based on these key attributes, "create date," "review and confirm signed-in," and "review and confirm sign-up," a model can be created and trained in order to test data sets. These attributes are merely examples for creating a model and other attributes and combination of attributes can be used.

This model can take the historical data from the case management and task management system and data from the web analytics service system. The model can change every day based on the data and the values of the key attributes. The threshold as to whether additional detailed data should be brought in can be driven by the model. For example, the model can predict that the threshold needs to increase because there is a new contract signed with a merchant that will result in an increased conversion rate. The model can predict that the threshold needs to decrease if a merchant contract is ending. If a threshold drops due to sign-in issues, the model can predict and recommend that detailed data should be obtained.

In the above scenario a decision tree or support vector machine (SVM) machine learning algorithm can be used. A decision tree can include a structure that includes a root node, branches, and leaf nodes regarding the data analysis. A decision tree can correspond to a machine learning algorithm.

At step 640, the operation status of the online payment application system is predicted based on the data that is modeled in step 630. The unified smart connector predicts a status of an operation based on the modeled data.

At step 650, the unified smart connector will automatically determine whether the status of the operation satisfies the predetermined threshold. If the status of the operation satisfies the predetermined threshold or boundary, then no further action is required. It can be determined that an operation status is operating as desired. The predetermined threshold can be identified by an analyst of the transaction processor. Alternatively, the unified smart connector can determine the predetermined threshold based on operation outcomes that are desired.

However, if the status of the operation does not satisfy a predetermined threshold, at step 660, the unified smart connector can automatically determine that additional case management data is needed from the case management and task management system in order to determine why the operation is not satisfying the predetermined threshold. The unified smart connector can automatically determine that additional data is required based on the embedded routines and the unified smart connector can drive the extraction of the data. The unified smart connector can automatically identify any additional data (e.g., case management data) that is needed from the case management and task management system.

At step 670, the unified smart connector will automatically request the additional case management data from the case management and task management system.

At step 680, the additional data that is received from the case management and task management system is sent to the table (e.g., Table 2) of the EDW. If additional data is stored in the table of the EDW, the method can return to step 630.

Figure 7:
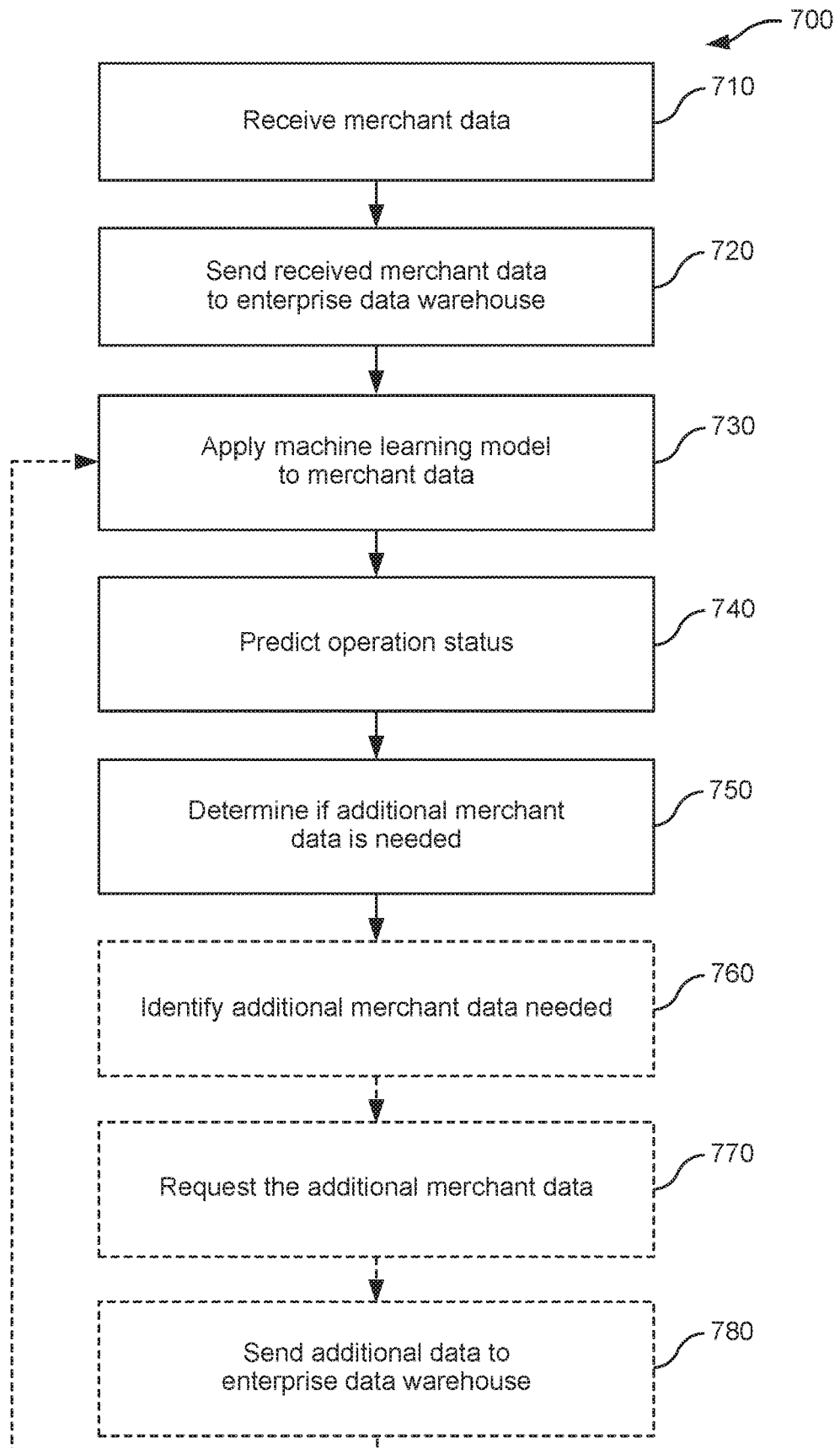
FIG. 7 illustrates a flowchart of a method for analyzing merchant data, in accordance with some embodiments.

FIG. 7 illustrates a flowchart of a method 700 for analyzing merchant data, in accordance with some embodiments. The merchant data is analyzed in order to identify merchants using the transaction processing system. The data can be used for the identification of merchants on the transaction processor's global network. The transaction processing system can be a global network. In the example shown in FIG. 7, the unified smart connector receives an analyzes merchant data from a global merchant repository (GMR). The GMR can be an application of the transaction processor and can enable tracking of merchant related attributes.

At step 710, the unified smart connector receives data from one or more global merchant repositories (GMR). The unified smart connector can be configured to routinely receive information for analysis. Alternatively, the unified smart connector can determine when data should be analyzed and independently request data from cloud providers. The unified smart connector can receive the data from a merchant data and task management system in response to a request sent by the unified smart connector to the merchant data and task management system.

The unified smart connector can extract data from the transaction processor's global network (e.g., VisaNet™) for authorization and settlement. Authorization of a payment can include validating the card being used and/or checking a pin entered by a user. For example, an acquirer can verify a credit card number, the transaction type and the amount with the issuer (card-issuing bank) and reserves that amount of the cardholders credit limit for the merchant. An authorization will generate an approval code, which the merchant stores with the transaction. Payment settlement occurs when, for example, the acquirer sends the batch transactions through the credit card association, which debits the issuers for payment and credits the acquirer. Therefore, the issuer pays the acquirer for the transaction.

At step 720, the merchant data that is received from the GMR is sent to a storage. Specifically, the merchant data can be sent to a table in an Enterprise Data Warehouse (EDW) for storage.

Table 3 below illustrates a table of an EDW storing the merchant data. Merchant data includes information on a merchant such as name, city, state and country where the merchant is located, etc. As shown in Table 3, aggregated data of merchant data is extracted by the unified smart connector and is available in a table, such as a table in an EDW. Although an EDW is used an example, this is merely an example and different types of tables for storage can be used.

TABLE 3

| Target Column | Source Column & Transformation |
|---|---|
| GMR_ID | GMR ID generated for Merchant |
| Merchant Name | Name of the Merchant |
| Merchant City | City of the Merchant |
| Merchant State | Merchant State |
| Merchant Country | Merchant Country |
| MCC | Merchant Category Code |
| Acquirer BIN | Merchant Acquirer BIN |
| CRT_TS | CREATED TIMESTAMP |

At step 730, a machine learning model can be applied to the data that is stored in the table (e.g., Table 3) of the EDW.

The VisaNet™ authorization data key attributes can include Created Timestamp (CRT_TS), Merchant Name, Merchant City, Merchant State, etc. The GMR Key attributes can include Merchant Name, Merchant City, Merchant State, Merchant Category Code, and Acquirer BIN, etc. These attributes are related to particular merchants. Further, these attributes can be populated during the course of a transaction authorization. Based on, for example, these five key attributes, a model can be created along with the training and test data sets. This model will take the historical data from both GMR and VisaNet™ details. The model will change every day based on the data and the key attributes value. The threshold to bring in additional data is driven by the model. For example the model will predict that additional analysis needs to be done as the number of new GMR IDs created is, for example, beyond a threshold of GMR ID's that have been created in the past. For example, the number of new GMR IDs is more than what is usually created in a day.

In the above scenario a decision tree or support vector machine (SVM) machine learning algorithm can be used. A decision tree can include a structure that includes a root node, branches, and leaf nodes regarding the data analysis.

At step 740, the operation status of the online payment application system is predicted based on the data that is modeled in step 730. The unified smart connector predicts a status of an operation based on the modeled data.

At step 750, the unified smart connector will automatically determine whether the status of the operation satisfies the predetermined threshold. If the status of the operation satisfies the predetermined threshold, then no further action is required. The predetermined threshold can be identified by an analyst of the transaction processor. Alternatively, the unified smart connector can determine the predetermined criteria based on operation outcomes that are desired. If there are new merchant files (e.g., merchant creation rate), the threshold can increase. If merchants are expiring (e.g., merchant removal rate), the threshold can decrease.

However, if the status of the operation does not satisfy a predetermined threshold, at step 760, the unified smart connector can automatically determine additional merchant data that is needed from the GMR in order to determine why the operation is not satisfying the predetermined threshold. The unified smart connector can automatically identify any additional data (e.g., merchant data) that is needed from the GMR.

At step 770, the unified smart connector will automatically request the additional needed merchant data from the GMR.

At step 780, the additional data is sent to the table (e.g., Table 3) of the EDW. If additional data is stored in the table of the EDW, the method can return to step 730.

The user (e.g., analyst) can be notified of any anomalies. For example, the user can be notified of new GMR merchant or acquirer, there are more VisaNet™ acceptances, and/or error conditions when creating new GMR merchant IDs.

The unified smart connector can be implemented based on the supervised learning. It can also be expanded to support unsupervised learning so that the unified smart connector can make decisions during data movement when the variables are unknown.

The unified smart connector increases productivity by increasing efficiency and supportability. The unified smart connector enables Root Cause Analysis (RCA) to be performed along with the data movements. RCA can include methods for problem solving by identifying root causes of faults or problems.

The unified smart connector provides a single central connection between sources and targets for a transaction processing system. Therefore, data driven decisions can be performed quickly and efficiently.

D. Computer System

The various participants and elements described herein may operate one or more computer apparatuses to facilitate the functions described herein. Any of the elements in the above-described FIG. 1-3, including any servers or databases, may use any suitable number of subsystems to facilitate the functions described herein. The subsystems can be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may be embodied by a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Some embodiments can be implemented in the form of control logic in software or hardware or a combination of both. The control logic may be stored in an information storage medium as a plurality of instructions adapted to direct an information processing device to perform a set of steps disclosed in the example embodiments. Based on the disclosure and teachings provided herein, a person of ordinary skill in the art will appreciate other ways and/or methods to implement the example embodiments.

Any recitation of "a", "an" or "the" is intended to mean "one or more" unless specifically indicated to the contrary.

The above description is illustrative and is not restrictive. Many variations of the example embodiments will become apparent to those skilled in the art upon review of the disclosure. The scope of the example embodiments should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method of centrally analyzing data in a cloud environment, the method comprising:
    receiving, by a unified smart connector, data from a first cloud data source of one or more cloud data sources, wherein the unified smart connector is configured to connect elements in a multi-layer environment to provide communications between elements that are at least one of a combination of internal and external facing applications and systems;
    sending the data received from the one or more cloud data sources and metadata associated with the data to a table for storage;
    applying a machine learning model to the data stored in the table to create modeled data, wherein the machine learning model that is applied is selected based on a predetermined operating threshold;
    predicting a status of an operation based on the modeled data;
    determining whether the status of the operation satisfies the predetermined operating threshold; and
    in response to the status being below the predetermined operating threshold, automatically determining, by the unified smart connector, that:
    additional data is needed from the one or more cloud data sources based on the metadata associated with the data from the one or more cloud data sources,
    a source of the additional that data is needed, and
    a target location for storing the additional data that is needed.

2. The method according to claim 1, wherein the unified smart connector connects the one or more cloud data sources to one or more cloud data targets, and wherein the table is stored in the one or more cloud data targets.

3. The method according to claim 2, wherein the one or more cloud data sources are cloud data providers.

4. The method according to claim 1, further comprising:
    automatically identifying the additional data that is needed from the one or more cloud data sources;
    automatically requesting the additional data from the one or more cloud data sources; and
    sending the requested additional data to the table for storage.

5. The method according to claim 1, wherein the unified smart connector is a data-as-a-service (DaaS) connector configured to provide DaaS.

6. The method according to claim 1, wherein the machine learning model comprises one of an autoregressive integrated moving average (ARIMA) model, a support vector machine (SVM) model, and an artificial neural network (ANN) model.

7. The method according to claim 1, wherein the data from the one or more cloud data sources is historical aggregated data.

8. The method according to claim 1, wherein the unified smart connector is configured to predict the status of the operation upon receipt of the data from the one or more cloud data sources.

9. The method according to claim 1, further comprising in response to the status of the operation being below the predetermined threshold, providing a user with an alert regarding the status of the operation.

10. The method according to claim 1, further comprising providing a report to a user identifying areas of the operation requiring user attention.

11. The method according to claim 1, wherein the unified smart connector is central connector configured to perform authentication, extraction, transformation and publishing of data from the one or more cloud data sources.

12. The method according to claim 1, wherein the unified smart connector is a metadata driven connector configured to process data from one or more cloud data providers in a metadata framework.

13. The method according to claim 1, further comprising: determining whether the data received from the first cloud data source has an operation issue; and in response to determining that the data received from the first cloud data source does not have an operation issue, requesting data from a second cloud data source of the one or more cloud data sources.

14. A device comprising:
    one or more processors; and
    a memory coupled to the one or more processors, the memory comprising code for causing the one or more processors to implement a method comprising:
    receiving, by a unified smart connector, data from a first cloud data source of one or more cloud data sources, wherein the unified smart connector is configured to connect elements in a multi-layer environment to provide communications between elements that are at least one of a combination of internal and external facing applications and systems;
    sending the data received from the one or more cloud data sources and metadata associated with the data to a table for storage;
    applying a machine learning model to the data stored in the table to create modeled data, wherein the machine learning model that is applied is selected based on a predetermined operating threshold;
    predicting a status of an operation based on the modeled data;
    determining whether the status of the operation satisfies the predetermined operating threshold; and
    in response to the status being below the predetermined operating threshold, automatically determining, by the unified smart connector, that:

additional data is needed from the one or more cloud data sources based on the metadata associated with the data from the one or more cloud data sources, a source of the additional that data is needed, and a target location for storing the additional data that is needed.

15. The device according to claim 14, further comprising code for causing the one or more processors to:

automatically identifying the additional data that is needed from the one or more cloud data sources;

automatically requesting the additional data from the one or more cloud data sources; and sending the requested additional data to the table for storage.

16. The device according to claim 14, wherein the unified smart connector connects the one or more cloud data sources to one or more cloud data targets, and wherein the table is stored in the one or more cloud data targets.

17. The device according to claim 14, wherein the unified smart connector is a data-as-a-service (DaaS) connector configured to provide DaaS.

18. The device according to claim 14, wherein the machine learning model comprises one of an autoregressive integrated moving average (ARIMA) model, a support vector machine (SVM) model, and an artificial neural network (ANN) model.

19. The device according to claim 14, wherein the unified smart connector is configured to predict the status of the operation upon receipt of the data from a cloud data source.

20. A non-transitory computer-readable storage medium storing a plurality of instructions executable by one or more processors to cause the one or more processors to perform operations comprising:

receiving, by a unified smart connector, data from a first cloud data source of one or more cloud data sources, wherein the unified smart connector is configured to connect elements in a multi-layer environment to provide communications between elements that are at least one of a combination of internal and external facing applications and systems;

sending the data received from the one or more cloud data sources and metadata associated with the data to a table for storage;

applying a machine learning model to the data stored in the table to create modeled data, wherein the machine learning model that is applied is selected based on a predetermined operating threshold;

predicting a status of an operation based on the modeled data;

determining whether the status of the operation satisfies the predetermined operating threshold; and in response to the status being below the predetermined operating threshold, automatically determining, by the unified smart connector, that:

additional data is needed from the one or more cloud data sources based on the metadata associated with the data from the one or more cloud data sources, a source of the additional that data is needed, and a target location for storing the additional data that is needed.

* * * * *